Figure 8:
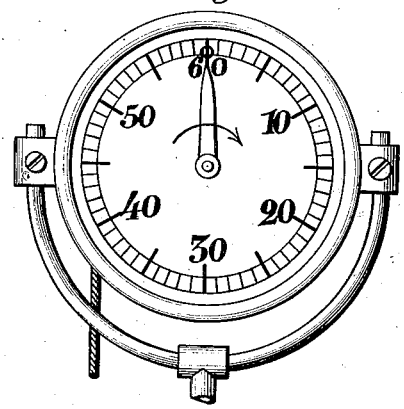

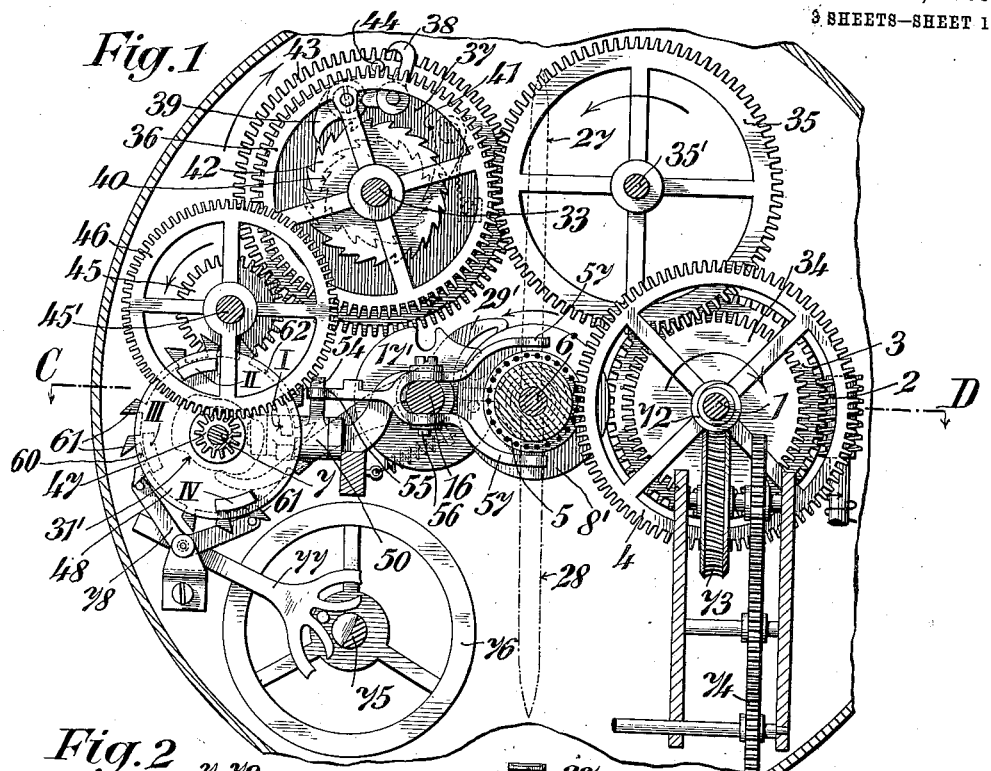

W. SCHAUFELBERGER.
SPEED INDICATOR.
APPLICATION FILED MAR. 27, 1907.
938,898.
Patented Nov. 2, 1909.
3 SHEETS—SHEET 2.
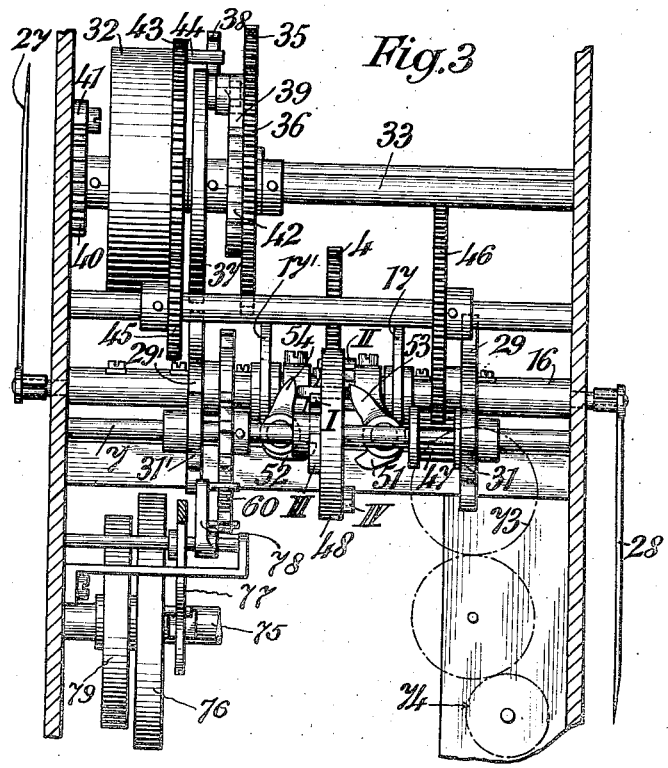
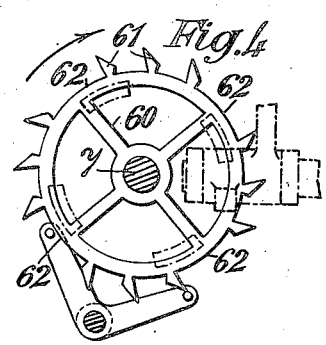
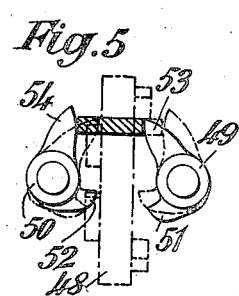
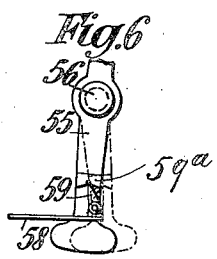
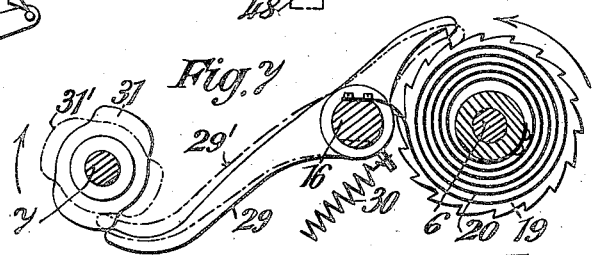
Witnesses:
R. V. Dommers
Jesse N. Lutton
Inventor:
Wilhelm Schaufelberger
by Henry Ort
Atty

W. SCHAUFELBERGER.
SPEED INDICATOR.
APPLICATION FILED MAR. 27, 1907.

938,898.

Patented Nov. 2, 1909.

3 SHEETS—SHEET 3.

Witnesses:

Inventor:
Wilhelm Schaufelberger
by Henry Orth Jr.
Atty

UNITED STATES PATENT OFFICE.

WILHELM SCHAUFELBERGER, OF ZURICH, SWITZERLAND.

SPEED-INDICATOR.

938,898.  Specification of Letters Patent.  Patented Nov. 2, 1909.

Application filed March 27, 1907. Serial No. 364,802.

*To all whom it may concern:*

Be it known that I, WILHELM SCHAUFELBERGER, a citizen of the Republic of Switzerland, residing at Zurich, Switzerland, have invented certain new and useful Improvements in Speed-Indicators; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

My invention relates to a positively actuated speed indicator having at most two pointer setting devices, there being such a setting device coupled by the aid of clockwork during a certain time (period of measuring) with the shaft which is to be controlled, and there being two spring actuated pointer arresting devices, stopped and released from the clockwork that controls the setting device, which arresting devices on the one hand are brought by the setting device into the position corresponding to the average speed during this period of measuring, and on the other hand are locked in this position during certain other periods and hold the pointer system during certain periods. The drawing illustrates one form of construction of such a speed indicator, in which the coupling and uncoupling of the setting device and the shaft, and the release and locking of the pointer arresting device, are effected by purely mechanical means; in which, further, two pointer arresting devices, that can be locked and released by purely mechanical means by the aid of the clockwork, and which are each in connection with a setting device, act jointly upon the pointer system in such manner that the latter can change from the position corresponding to the average speed of one measuring period directly into the position which corresponds to the average speed of the following measuring period.

Figure 9:
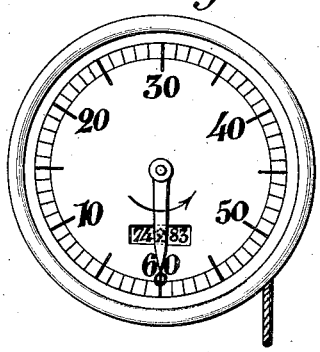
Figure 10:
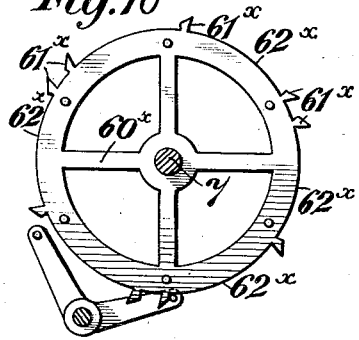

Figure 1 is a section through the apparatus, taken on the line A—B of Fig. 2. Fig. 2 is a section on the line C—D of Fig. 1. Fig. 3 is a side elevation of Fig. 1. Figs. 4—7 show details to be hereinafter referred to, drawn to a larger scale. Fig. 8 is a front view of the indicator, and Fig. 9 is a back view thereof. Fig. 10 shows a modified form of escapement wheel hereinafter refererd to.

The shaft 1 receives its motion from the shaft whose speed is to be indicated (for instance, the axle of a vehicle) by means of a spiral wire shaft or other suitable flexible shaft and worm 2 and worm-wheel 3. The latter is shown in the drawing, Fig. 2, as being coupled with the main driving shaft 1 of the indicator by means of a friction clutch, for the purpose of avoiding injury to the apparatus in the event of irregularity in working.

The toothed wheel 4 mounted on the main driving shaft 1 meshes with the toothed wheel 5, which is loosely mounted on the shaft 6, upon which it can slide axially. Rigidly secured to each side of the toothed wheel 5 are clutch wheels 8, 8'. The wheels 5, 8, 8' are shifted laterally by means of the clockwork and a reversing device at certain intervals (at the end of each period of measuring), in such manner that the clutch wheels engage alternately, 8 with 9, and 8' with 9'. By means of the clutch wheel 8 which is continuously driven by the driving wheel 4, one setting device consisting of the clutch-wheel 9, wheel 10 and lever 12 (which are screwed together to form one rigid piece by means of the nut 13), is turned on the shaft 6, from its initial position, to which it tends to return under action of the spiral spring 11 that is secured at one end to the boss of the flange 14 and at its other end to the fixed cross rod 16 thereby winding up the spring.

The wheel 10 constitutes the driving wheel of a Maltese gear, whose finger Fig. 2 in the initial position lies against the star wheel 17 of the gear, which latter wheel 17 is free to turn on the fixed cross rod 16 when not otherwise restrained. A pin 18 laterally projecting from a ratchet wheel 19 lies against the lever 12 and this ratchet wheel 19, which is loose on the axle 6, will also be rotated against the action of a spiral spring 20 located between the ratchet wheel 19 and a flange 21, the ends of said spring being rigidly connected respectively to the ratchet wheel 19 of the pointer arresting device 19, 21, 22, 23 and to the fixed cross rod 16.

A pin 24 in disk 25 rests against a lever 22, which carries the disk 25 around on rotation. But as this disk is mounted fast on the shaft 6, the latter is rotated against the action of the spring 26 one end of which is secured to the boss of the disk 25′ which is fixed on the shaft 6 and the other end to the fixed rod 16. On the shaft 6 there are mounted two pointers 27, 28, one at each end of the said shaft and moving over dials. The pointers 27, 28 are oppositely directed, so that the one acts as counterweight for the other.

The just described parts, the setting-device 9—15, and pointer arresting device 19—23, are duplicated on the opposite side of the toothed wheel 5 in order to insure a continuity of working of the whole device and prevent the pointer returning to zero position after each impulse, both setting devices being connected to the same shaft. In Fig. 2 the corresponding parts on each side of the said wheel 5 are denoted by like reference-characters, the parts on the one side, however, being distinguished by the addition of an index-stroke.

On the fixed cross rod 16 there are loosely mounted two pawls 29, 29′ for the pointer arresting devices, each pawl being provided with a spring 30 (Fig. 7), whereby the ratchet wheels 19, 19′ can be prevented from being rotated backward by their spiral springs 20, 20′. The pawls are each actuated by a cam disk 31, 31′ respectively, mounted on the arbor 7 of the escapement-wheel of the clockwork. The spring for driving the clockwork which serves to reverse the clutch-wheels 8, 8′, is located in the barrel 32 (Fig. 3), its one end being secured to the arbor 33, while the other end is secured to the barrel 32 loosely mounted on the arbor 33. The spring is wound up, by means of the train 34, 35, 36, from the main driving shaft 1. The disk 37 with hook 38 and pawl 39 is rigidly secured to the winding arbor 33; this is also the case with the ratchet wheel 40, in which the detent 41 engages, which detent is pivoted to one of the frame plates. On the arbor 33 there are loosely mounted the ratchet wheel 42 and toothed wheel 36, rigidly secured together. The pawl 39 engages in the ratchet wheel 42. The clockwork is driven by the toothed wheel 43, which forms one wall of the spring barrel. The toothed wheel 43 is provided with a pin 44, which is of sufficient length to turn the hook 38 on rotation of the wheel 43 and thus bring the pawl 39 into or out of engagement with the wheel 42. When the barrel, with pin 44, turns from the position shown in Fig. 1 in the direction of the arrow (Fig. 1), being loose on shaft 33 which is now stationary, the pin 44 will contact with the hook 38 which is also stationary and turn it in the same direction, so that it brings the pawl 39 into engagement with the ratchet wheel 42. This ratchet wheel, however, is always in course of rotation in the direction of the arrow (Fig. 1); the disk 37 and thus the arbor 33 will be turned, the driving spring wound up until, after about one complete revolution when the hook rides under pin 44 and turns the pawl 39, in opposite direction and causes disengagement. The ratchet wheel 40 and pawl 41 prevent backward rotation of the shaft 33. This automatic winding device for the driving spring has the advantage over prior devices of this description, in that the connecting shaft of the apparatus (spiral wire shaft) connecting the indicator to the element whose speed is to be measured during the winding operation is subject to a steady strain instead of being jerked. The motion of the wheel 43 is transmitted by means of the intermediate train 45, 46, 47, to the escapement wheel arbor 7, which is driven thereby; the rotation being regulated by the balance. In the form of construction illustrated, the clockwork is shown as having an anchor escapement. This escapement comprises the balance wheel 76 mounted on arbor 75, the balance lever 77, the anchor 78 and the balance spring 79. (Figs. 1, 2 and 3.) The escapement of the clockwork is of such construction that, firstly, it permits the escapement wheel 60 to make relatively large movements in order that the escapement wheel arbor, with the aid of the kinetic energy thus obtained, may be able to effect rapid coupling and uncoupling of the setting devices that are actuated from the shaft or other rotatable element that is to be indicated; and that, secondly, it may allow the escapement wheel 60 between these large movements also to make the small movements whereby the clock-balance receives impulses to keep it in proper motion. In order to render the balance less sensitive to external influences, such as shocks, etc., it is advantageous to allow it to execute rapid oscillations, for instance, six half oscillations per second. In this case the escapement wheel 60, if for the instrument a measuring period of one second is selected, may be divided as shown in Fig. 4. As the drawing shows, the circumference of the wheel is divided into four equal parts and each quarter possesses three small teeth 61 with the gaps necessary for the anchor between them as small as possible. The space 62 between the last tooth of the one quarter and the next tooth of the succeeding quarter is considerable. This space may be any desired size, not having to be the same as a gap between the teeth. The anchor for the escapement wheel may advantageously embrace an angular space which measured on the escapement wheel is two tooth-divisions plus the said space. At each half oscillation of the balance the escapement wheel turns through a half tooth-division, but at the sixth, through a half tooth-division plus the above mentioned space. By allowing the escapement wheel to turn freely through a large angle its arbor acquires a high angular velocity and the kinetic energy of the escapement wheel arbor and the parts carried thereby may now be utilized for rapidly coupling and uncoupling of the setting devices. This rapid coupling and uncoupling of the setting devices is important on account of the small periods of measurement indicated by the instrument.

The escapement wheel 60$^x$ may be divided as shown in Fig. 10, in order, with equal duration of the oscillations of the balance, to obtain a reversal at every three half oscillations, i. e., so as to enable a measuring period of one half second. The essential feature of this manner of division is that there are spaces between the escapement wheel teeth 61$^x$, which enable large angles of rotation of the escapement wheel, the working capacity of the latter thus obtained being then utilized for effecting reversal. The reversal is effected as follows: On the escapement wheel arbor 7 there is mounted the clutch shifting wheel 48 between the wiper rollers 49, 50. This wheel 48 has four projections I, II, III, IV (Figs. 1 and 2), arranged alternately on opposite sides of the wheel and located 90° apart. The wipers 51, 52 of the rollers 49, 50 are such that on rotation of the wheel 48 they can move into the path of the projections, and also be pushed back by them. The projections on the sides of the wheel 48 cause the rotation of the rollers, while other wipers 53, 54 on these rollers on rotation of the latter effect reversal of the lever 55. The latter, is pivoted at 56, to the fixed cross rod 16, and engages by means of the fork 57 on both sides of the pointer shaft 6, between the clutch wheels 8 and 8′, so that the latter can be shifted axially by the said fork 55, 57 and thus reverse the coupling with the setting devices. It may happen that reversal takes place at such moment in which deep engagement of the clutch wheels is impossible on account of their mutual position at the time. To prevent arrest of the clockwork in such case, there is provided a spring 58 secured at one end to a suitable stationary part of the frame or casing and whose other end is provided with a pivoted pallet 59 (Fig. 6), which bears against a projection 59$^a$ on the lever 55, so that the spring 58 can effect the completion of the engagement even after the escapement wheel has been again arrested.

The operation of the speed indicator as above described, starting with the parts in the position shown in Figs. 1–3, is as follows: At the commencement of the period of measuring, when the last one of a group of three teeth of the escapement wheel 60 has passed the anchor pin, the escapement wheel turns through a large angle of rotation, taking the wheel 48 and arbor 7 with it. After about one half of the angle of rotation has been traversed, the projection I strikes the wiper 52 and turns the roller 50, which on its part by means of the wiper 54 turns the forked lever 55, 57 through a small angle, to shift the tail of lever 55. The forked end 57 of the lever 55 effects sliding of the continuously rotating toothed wheel 5, so that the clutch wheels 8′, 9′ engage. At the same time this turning of the forked lever 55, 57, by means of the wipers 52, 54 will also bring about rotation of the roller 49, and the wiper 51 will come into the path of the succeeding projection II on the other side of the wheel, so that at the next large angle of rotation of the escapement wheel it will be pushed aside to reverse the lever and bring it again into the position shown in Fig. 2. The coupled setting device 9′—15′ will now commence to rotate when engagement between 8′ and 9′ has been effected beginning with the engagement of the Maltese gear 10′, 17′. Simultaneously with this rotation, the ratchet wheel 19′, and thus the pointer arresting device 19′—23′, will be released, the cam disk 31′ lifting the pawl 29′ on rotation of the escapement wheel arbor. The pointer arresting device 19′—23′ turns backward under the action of the spring 20′ until its pin 18′ strikes the arm 12′ and is again turned forward by the latter in unison with the constantly driven wheel 5. A short time before the said reversal of the clutch wheels 8 and 8′, the pointer arresting device 19—23 will have been locked by its pawl 29, actuated by the cam disk 31, to engage ratchet wheel 19, so that this pointer arresting device although it could move forward up to the moment of the just effected reversal, could not move backward under the influence of spring 20. The device, therefore, will have remained at the moment of reversal in its position of maximum rotation, and the wheel 25 with pin 24, i. e. the pointer system, will have stopped resting against the arm 22 of the pointer arresting device 19—23. Meanwhile the setting device, with pointer arresting device 19′—23′, will be rotated farther, during six half-oscillations of the balance. When five half-oscillations of the balance from the moment of the last reversal of the clutch wheels have been made, then upon the sixth, the last tooth of the succeeding group of teeth of the escapement wheel will escape, the escapement wheel is released, and can turn through a further large angle corresponding to a space 62, and by means of the wheel 48 effect reversal of the clutch wheels. During these six-half-oscillations of the balance, however, the pointer system has been resting on the locked pointer arresting device 19—23 and has remained in its position. Shortly before the reversal the pointer arresting piece 19'—23' has been locked by its pawl 29' actuated by the cam disk 31'. At the moment of reversal the setting device 9—15' snaps back into its initial position, which is determined by the Maltese gear 10'—17'. If during the last period of measuring the speed has increased, then from the moment in which the setting device 9'—15' has attained the angle of rotation of the pointer arresting device 19—23, the pointer system is moved forward, 24 moving out of contact with 22 and 22' contacting with 24' moves the pointers which are advanced up to the end of the measuring period and before which moment the pointer arresting device 19'—23' is locked against backward motion by its pawl 29'. If the speed has become smaller during this second period of measuring, the rotation of the setting device 9'—15' and of the pointer arresting device 19'—23' will not reach the pointer system i. e. 22' will not be moved into contact with 24' and the pointer system will rotate backward at the end of the measuring period under the influence of its spring 26, as soon as the pointer arresting device 19—23 is released by the pawl 29. This backward rotation is stopped by the pin 24' of the wheel 25' striking the arm 22' of the stopped pointer arresting device 19'—23'. The setting device 9'—15' at the end of the measuring period is drawn back by its spring 11' into the position of rest, which is determined by the Maltese gear 10', 17', and so on. The above-described movements are repeated at the end of each period of measuring.

It is to be remarked with the present speed indicator that with high speeds the setting device and thus also the pointer system can execute a complete revolution and more; this is rendered possible by the use of the Maltese gear. It is of advantage to divide the scale over which the pointer moves, corresponding to the minute divisions of a watch dial, into sixty equal parts, and to so select the ratio of transmission that a speed of 1 kilometer per hour corresponds to one division. In this manner at distances at which the figures are no longer visible, the number of kilometers indicated can be judged from the direction of the pointer. A pointer and dial is placed at each end of shaft 6 so that the speed can be read from the driver's seat as well as by the occupants of the car. Obviously one pointer and dial can be dispensed with should it be desirable to do so.

I claim:—

1. In combination in a speed indicator, a driving shaft, a pointer shaft and a pointer carried thereby, a pointer setting device and a pair of clutch disks mounted loosely on the pointer shaft, mechanical means for coupling and uncoupling the pointer shaft with the driving shaft, and two spring-actuated pointer arresting devices, comprising each a ratchet wheel, a pawl, mechanical means for periodically bringing the pawl into engagement with the ratchet wheel and thereby preventing backward rotation of the pointer arresting device on return of the setting device to the zero position, and clockwork for operating the said mechanical means, substantially as described.

2. In combination in a speed indicator, a driving shaft, a pointer shaft and a pointer thereon, a pointer setting device and a pair of clutch disks mounted loosely on the pointer shaft, mechanical means for coupling and uncoupling the pointer and driving shafts, and spring-actuated pointer arresting devices, comprising ratchet wheels, pawls, mechanical means for periodically bringing the pawls into engagement with said ratchet wheels to prevent backward rotation of the pointer-arresting devices on return of the setting device to the zero position, and clockwork for operating the said mechanical means, substantially as described.

3. In combination in a speed indicator, a driving shaft, a pointer, a pair of loosely rotatable pointer setting devices and a pair of pointer arresting devices, mechanical means for alternately coupling and uncoupling the setting devices to and from the driving shaft, means for periodically locking the pointer - arresting devices at different times, and clockwork for actuating such means.

4. In a speed indicator, the combination with a continuously rotating element; of a pointer and its shaft, two mechanisms periodically and alternately driven in unison with the element, pointer-arresting mechanisms driven by the periodically driven mechanisms, pawls to control the arresting mechanisms, means on the pointer shaft coöperating with the arresting mechanisms to control the relative angular position of the shaft and pointer, and clock mechanism controlling the periodic movement of the aforementioned elements.

5. In a speed indicator the combination with a pointer, a main driving shaft and a plurality of pointer setting devices to move the pointer in accordance with the speed during a small period of time; of means to drive the pointer setting devices, time controlled mechanism to periodically and successively cause said means to drive the pointer setting devices, and pointer arresting devices to temporarily and periodically arrest the pointer.

6. In a speed indicator the combination with a pointer, a main driving shaft and a pair of pointer setting devices moved in accordance with the speed during a small period of time, means rotated from the main driving shaft to drive the pointer setting devices, time controlled mechanism to periodically shift said means into and out of engagement with the setting devices alternately and pointer arresting devices operated from said time controlled mechanism to temporarily arrest the pointer.

7. In a speed indicator the combination with a main driving shaft, a time mechanism automatically and periodically wound from the main driving shaft, of a pointer and its shaft, pointer setting mechanisms loose on the shaft, means to drive the pointer setting mechanisms, devices actuated by the time mechanism to alternately connect the pointer-setting mechanisms to the main driving shaft, spring actuated pointer arresting mechanisms controlled by the time mechanism and means on the setting mechanisms to control the angular position of the arresting mechanisms at intervals.

8. In a speed indicator the combination with a main driving shaft, a time mechanism automatically and periodically wound from the main driving shaft; of a pointer and its shaft, two pointer setting mechanisms loose on the shaft, means to drive the pointer setting mechanisms, means to reverse the direction of rotation of the pointer setting mechanisms at the end of their driven period, devices actuated by the time mechanism to shift the connection from the main driving shaft alternately to the pointer setting mechanisms, spring actuated pointer arresting mechanisms controlled by the time mechanism and means on the setting mechanisms to control the angular position of the arresting mechanism and pointer.

9. In a speed indicator, the combination with a main driving shaft, a time mechanism automatically and periodically wound from the main driving shaft; of a pointer and its shaft, two pointer setting mechanisms loose on the pointer shaft, means to drive the pointer setting mechanisms, a spring for each setting mechanism to reverse its rotation, at the end of their driven periods, devices actuated by the time mechanism to shift the connection from the main driving shaft alternately to the pointer, setting mechanisms, pointer arresting mechanisms secured to the pointer shaft and controlled by the time mechanism, springs to urge the arresting mechanisms and pointer shaft in reverse direction and means on the setting mechanisms to control the angular position of the arresting mechanisms and pointer.

10. In a speed indicator the combination with a main driving shaft, a time mechanism automatically and periodically wound from the main driving shaft and a pointer and its shaft, of a clutch member loose on the pointer shaft and continuously driven from the main driving shaft, a pointer setting mechanism on each side of the clutch member also loose on the pointer shaft, a pointer arresting mechanism adjacent to each setting mechanism and secured on the pointer shaft, a clutch shifting device and means operated from the time mechanism to alternately shift the clutch into engagement with the pointer setting devices.

11. In a speed indicator, the combination with a clock train, having an escapement wheel and arbor, said escapement wheel having its teeth arranged at short and at long intervals apart, a balance wheel and anchor, a pointer and mechanism for actuating the same and means on the escapement wheel arbor to control the drivage of the same, the short angular movements of the escapement wheel controlling the balance wheel and the long angular movements the pointer actuating mechanisms.

In testimony that I claim the foregoing as my invention, I have signed my name in presence of two subscribing witnesses.

WILHELM SCHAUFELBERGER.

Witnesses:
HERMANN GRAF,
JOSEPH SIMON.